Sept. 2, 1958 E. R. KRETZMER 2,850,574

APPARATUS FOR COMPRESSION OF TELEVISION BANDWITH

Filed Nov. 2, 1955 7 Sheets-Sheet 1

INVENTOR
E. R. KRETZMER
BY David P. Kelley
ATTORNEY

APPARATUS FOR COMPRESSION OF TELEVISION BANDWITH

Filed Nov. 2, 1955 7 Sheets-Sheet 2

INVENTOR
E. R. KRETZMER
BY David P. Kelley
ATTORNEY

INVENTOR
E. R. KRETZMER
BY David P. Kelley
ATTORNEY

Sept. 2, 1958 E. R. KRETZMER 2,850,574

APPARATUS FOR COMPRESSION OF TELEVISION BANDWITH

Filed Nov. 2, 1955 7 Sheets-Sheet 4

INVENTOR
E. R. KRETZMER
BY David P. Kelley
ATTORNEY

Sept. 2, 1958 E. R. KRETZMER 2,850,574

APPARATUS FOR COMPRESSION OF TELEVISION BANDWITH

Filed Nov. 2, 1955 7 Sheets-Sheet 5

INVENTOR
E. R. KRETZMER
BY David P. Kelley
ATTORNEY

Sept. 2, 1958 E. R. KRETZMER 2,850,574

APPARATUS FOR COMPRESSION OF TELEVISION BANDWITH

Filed Nov. 2, 1955 7 Sheets-Sheet 6

INVENTOR
E. R. KRETZMER
BY David P. Kelley
ATTORNEY

INVENTOR
E. R. KRETZMER
BY David P. Kelley
ATTORNEY

United States Patent Office 2,850,574

Patented Sept. 2, 1958

2,850,574

APPARATUS FOR COMPRESSION OF TELEVISION BANDWIDTH

Ernest R. Kretzmer, New Providence, N. J., assignor to Bell Telephone Laboratories, Incorporated, New York, N. Y., a corporation of New York Application November 2, 1955, Serial No. 544,516

22 Claims. (Cl. 179—15.55)

This invention relates to the transmission and reception of electric communication signals and more particularly to the transmission and reception of electrical communication signals which ordinarily require considerable transmission channel capacity.

It is an object of this invention to effect a reduction in the transmission channel capacity required for the transmission of such signals.

It is another object of this invention to effect such a reduction in channel capacity without seriously degrading the communication signals being transmitted.

In the transmission of broad band communications signals, such as, for example, television signals, faithful reproduction at the receiver of the transmitted information necessitates a transmission channel which can accommodate the entire range of frequencies contained in the signal and the entire range of amplitudes with acceptable amplitude resolution. The resulting large channel capacity required for transmission is, economically, a defect in such systems, and workers in the art are constantly seeking ways and means of reducing the necessary channel capacity.

Among the various systems proposed to accomplish this reduction, in general, two main approaches have been used. One approach, as embodied in the United States Patent 2,629,010 to R. E. Graham, comprises splitting the communication signal, in this case, a television video signal derived at normal scanning rates, into low and high frequency components.

Reduction in the total bandwidth is achieved by discarding a portion of the high frequency components. To this end, the picture pattern is reconstituted from only the high frequency components and then rescanned at a scanning rate lower than the normal scanning rate whereby there results a signal including a reduced range of high frequency components for transmission along with the signal including the low frequency components. At the receiver, the transmitted signal including the reduced range of high frequency components is used at the lower scanning rate to form a picture pattern and this pattern is rescanned at the normal scanning rate to provide a signal comprising the full range of high frequency components. This is combined with the transmitted signal including the low frequency components to form the signal to be used for reproducing a facsimile of the original picture scene. A problem associated with this technique however is that it requires terminal equipment of considerable complexity. In particular, the difficulties associated with reconstituting the picture pattern to reduce and increase the scanning rates necessitate the use of highly specialized and complex equipment.

Another approach to the problem, as disclosed in United States Patent 2,681,385 to B. M. Oliver, comprises sampling the communication signal at a specified rate and thereafter a linear combination of past samples is formed for predicting the amplitude of an instant sample and the error between the predicted amplitude and the actual amplitude is derived. If there is correlation in the picture scene, this makes possible an error signal which after quantization can be encoded in a manner that results in a reduction in total bandwidth. However, predicting with sufficient accuracy to result in a significant decrease in total bandwidth of the signal transmitted is also found to require complex terminal equipment.

The system disclosed in the Oliver patent makes use of sampling and quantizing which convert continuous scales of time and amplitude, respectively, into discrete scales, permitting representation of the signal by a finite number of code symbols chosen from an "alphabet" containing a finite number of symbols. As disclosed in the Oliver patent, sampling alone does not entail any loss of information if the sampling frequency is at least twice as great as the highest frequency of interest in the intelligence. In such case, the effects of sampling are not discernible in the final signal. Quantization likewise does not entail any loss of information if the number of quantizing levels is sufficiently high.

Heretofore, any effort to reduce channel capacity requirements by reducing the number of quantizing levels has given rise to annoying defects in the picture as finally viewed at the receiver. Since quantizing the signal divides the brightness range of the picture into a finite number of brightness levels, any gradual change in brightness across the picture will appear as a series of discrete steps, that is, there will be visible equal brightness contours in the picture. In addition, where, in the picture, there is a large area having a uniform brightness level near the limit of one quantizing level, a small amount of noise may shift the amplitudes of random samples of the picture signal into the next quantizing level, giving rise to defects in the picture which can be quite disturbing to the viewer. It has been necessary, therefore, to quantize at a sufficiently large number of levels to prevent these picture defects from becoming intolerable to the viewer. However, when such a number of levels is used, encoding the quantized signal in order to reduce channel requirements becomes impractical. Thus such an encoding technique as remapping, for example, while offering great savings in channel requirements in theory, has given little or no savings in practice.

The present invention is directed to a system which effects a reduction in bandwidth by a degradation of the signal in a manner that is substantially not discernible to the human senses.

It is in accordance with the present invention to separate the original signal into two portions to which the human senses are sensitive to markedly different degrees. That portion to which the human senses are most sensitive is transmitted with little or no degradation while that portion to which the human senses are little sensitive is modified to reduce its frequency range whereby the total frequency range transmitted is reduced. In particular, the desired reduction in bandwidth is effected by quantizing coarsely which in turn permits encoding readily in a manner that results in a reduction in required channel capacity.

In a preferred embodiment of the present invention directed specifically for use with television transmission the required communication channel capacity is reduced considerably by dividing the television signal into a pair of frequency bands, one of which contains the low frequency portions of the signal, and the other of which contains the high frequency portions. The high frequency portion of the signal is sampled, coarsely quantized, coded, and transmitted at a reduced channel capacity while the low frequency portion is transmitted intact. At the receiver the coded high frequency portion of the signal is decoded and recombined with the low frequency portion to produce a complete signal.

A particular feature of the preferred embodiment is that prior to sampling, the high frequency portion of the signal is modified by the removal of some of the high frequency components. The transmission channel is thus relieved of the burden of transmitting these high frequency components, which are quite susceptible to degradation by noise. At the receiver these high frequency components are added to the low frequency portion of the signal prior to combining with the high frequency portion of the signal.

Various other illustrative embodiments will be described herein, each of which is characterized by a separation of the signal into two or more portions, one or more of the portions then being operated upon to achieve a reduction in the required channel capacity.

The invention will be better understood from the following detailed description taken in conjunction with the accompanying drawings, in which:

Fig. 1 is a block diagram of a television signal transmission system embodying the principles of the present invention;

Figs. 2(*a*) and 2(*b*) are diagrams illustrating particular encoding techniques;

The invention will be explained hereinafter as applied to the transmission of television video signals, although it is not intended to be limited to the transmission of such signals, inasmuch as the principles of the invention are readily applicable to the transmission of other types of electrical communication signals such as, for example, telephone signals of audio frequencies.

In the reproduction of video signals, what will be an image satisfactory to the viewer depends upon the properties of the eye, such as persistence of vision and the acuity demands of the eye, and upon observer tolerance, that is, departures from perfection which can be tolerated by the viewer. In the foregoing it was pointed out that quantizing a video signal with an insufficient number of levels gives rise to two principal annoyances, namely brightness contour lines, and imperfect quantizing as a result of random noise. Both of these phenomena are "large-area" effects. That is, they become intolerable only when they occur in portions of the picture where the eye is sufficiently acute to observe them. These portions of the picture contain only small amounts of detail and so involve low frequency components of the video spectrum yet, in general, occupy large areas in the picture. On the other hand, it has been observed by applicant that the areas of the picture containing large amounts of detail, which involve the high frequency components of the video spectrum do not appear to give rise to these annoyances. This can be accounted for by the fact that although these effects of quantizing might be present the eye of the observer is not sufficiently acute to observe them. In the present invention, use is made of this phenomenon of visual acuity to effect a reduction in the necessary channel capacity.

Figure 1:
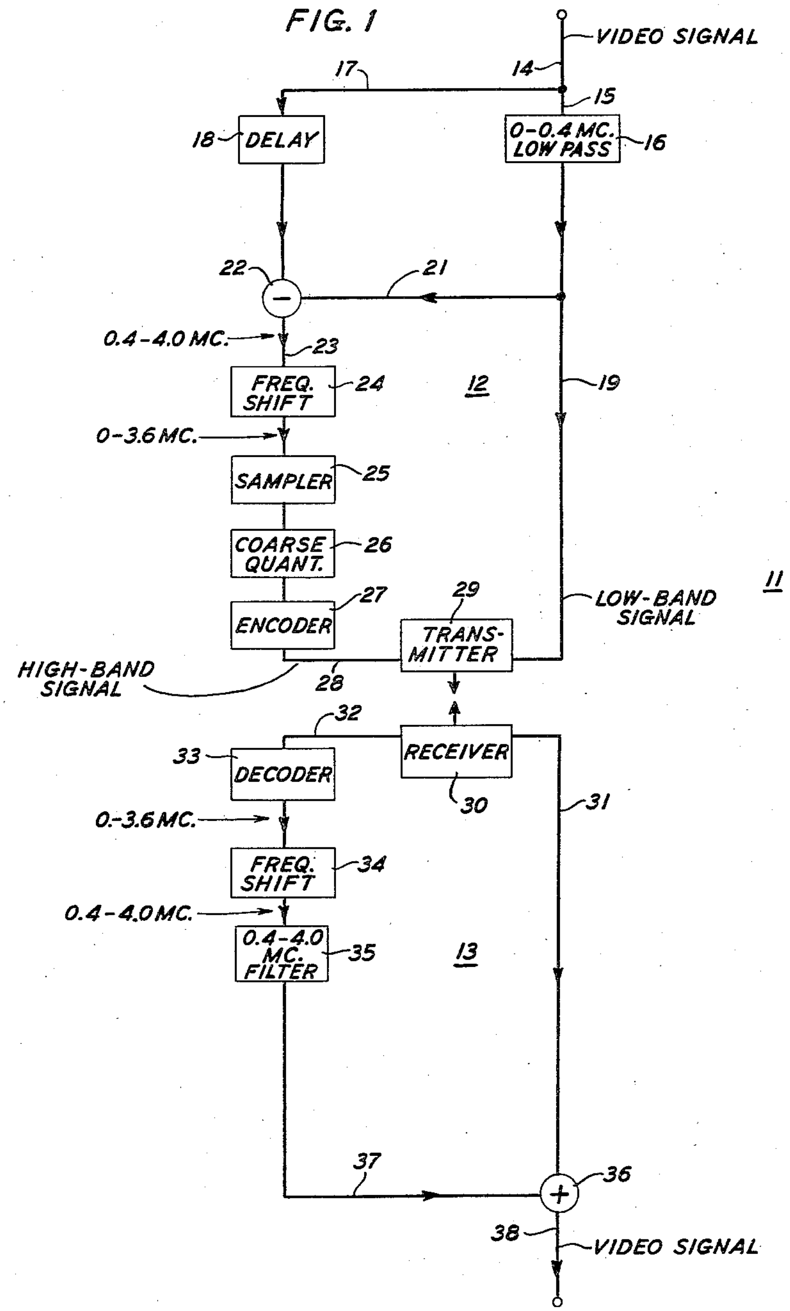

Turning now to Fig. 1, there is a television signal transmission system 11 embodying the principles of the invention. The system comprises a transmitter station 12 and a receiving station 13. Only those portions of the transmitter 12 and receiver 13 which deal with the present invention are shown, the remaining portions being standard and well known in the art. Transmitter 12 comprises a video signal input 14 which receives the complete video signal from the video camera and associated amplifiers, not shown. The complete video signal, which is the standard RTMA signal occupying a zero to 4 megacycle frequency band, is fed to a first path 15 which contains a low pass filter 16 which passes those frequencies in the video signal in the range from zero to 400 kilocycles, for example. This range is based upon the arbitrary designation of approximately one-fiftieth of the picture width constituting a "large area." It has been found that this is the frequency band where signal degradation is most annoying to the observer. It is to be understood however, that this designation is merely by way of example, and applicant does not intend to limit his invention to the particular range shown. At the same time that the signal is fed to path 15, it is also fed to a parallel path 17, which contains a delay line or element 18. Delay element 18 is chosen to have a delay characteristic which is the same as the delay characteristic of filter 16, for reasons which will be apparent hereinafter. The output of filter 16 which contains only those frequencies in the video signal in the range from zero to 400 kilocycles is fed to a pair of paths 19 and 21. Path 19 leads to those elements of a transmitter which are standard, such as modulators and power amplifiers, and hence, for the sake of clarity, are shown simply as block 29. Path 21 leads to a subtractor 22 which may be a differential amplifier or any other form of subtractor well known in the art. The delayed video signal is likewise fed to the subtractor 22 from delay element 18, where the low frequency signal in path 21 is subtracted from it, the output of subtractor 22 being the video signal minus those frequencies in the range from zero to 400 kilocycles, or, in other words, the output of the subtractor 22 is the high frequency portion of the video signal. It is readily apparent that the video signal can be separated into high and low frequency portions by the use of high and low pass filters in paths 17 and 15 respectively, instead of in the manner shown in Fig. 1. The high frequency portion is fed to a frequency shifter 24 over path 23. Frequency shifter 24, which may take any one of a number of forms well known in the art, such as a simple heterodyning circuit, shifts the frequency of the high band signals from the 0.4 to 4 megacycles range down to a range from zero to 3.6 megacycles. While such shifting of the frequency band of the high frequency signals is not strictly necessary, it will be apparent hereinafter that such shifting of the frequency band to a zero reference permits a maximum theoretical reduction in required channel capacity. The signal output of frequency shifter 24 is fed to a signal sampling circuit 25, where it is sampled at a rate which is twice the highest frequency of interest in the signal, in this case, 7.2 megacycles per second. As explained in the aforementioned Oliver patent, a sampling rate which is twice the highest frequency of the signal results in no loss of signal definition, and does not change the channel capacity requirements. The sampled signal output of the sampler 25 is fed to a coarse quantizing circuit 26, where the signal samples are quantized into a plurality of discrete amplitude levels. The technique of quantizing is well known in the art, hence it is not believed necessary to discuss this operation at length. However, by virtue of the separation of the video signal into two portions, it is made feasible to quantize the high frequency signals in an exceedingly coarse fashion, that is, only a few amplitude levels. As will become apparent hereinafter, this freedom to quantize coarsely has a number of advantages.

The output of the quantizer, which is a plurality of pulses of discrete amplitude levels having a repetition rate which is twice the highest frequency of interest in the shifted video signal, is fed to an encoder 27 which is used to encode the signal in a manner which takes advantage of the smaller required channel capacity. As will be discussed more fully hereinafter, encoder 27 may take any one of a number of suitable forms, depending upon such things as available channel capacity, signal-to-noise ratio of the channel, and the particular type of transmission desired.

After encoding, the high band signal on path 28 is sent to the remaining portions of the transmitter which are standard, hence represented here as block 29, where it may be combined with the low frequency signal for transmission over a single channel, or it may be sent separate from the low frequency signal if more than one channel is available.

Receiver 13 comprises those normal standard elements of a receiver such as receiving antenna and demodulators and the like which are represented by block 30. At the receiving station the received signal is again divided into a low frequency and a high frequency portion in a manner just opposite to that in which they were combined at the transmitter, and the low frequency portion is introduced into path 31 while the high frequency portion is introduced into path 32. Path 32 leads to a decoder 33, whose function is to decode the signal and reproduce therefrom a facsimile of that coded at the transmitter. The output of the decoder, which is a decoded quantized high frequency signal, is applied to a frequency shift device 34 where the frequency of the signal is shifted back to the frequency band which it occupied prior to the frequency shifting in the transmitter if the frequency was shifted at the transmitter. Frequency shifter 34 can be a simple heterodyning arrangement, as was the case with frequency shifter 24 in transmitter 11. The output of the frequency shifter is fed to an appropriate filter 35, which in this case can be a band pass filter for frequencies in the range from 0.4 to 4 megacycles. The purpose of filter 35 is to eliminate any unwanted components from the high frequency signal. The output of filter 35 is fed to a summation amplifier 36 over lead 37. Path 31, which carries the low frequency portion of the signal, also goes to amplifier 31 and the high frequency and low frequency portions of the signal are combined in amplifier 36 to give a complete video signal which is then distributed over path 38 to whatever means of distribution to receiving sets is used.

As was pointed out in the foregoing, the type of code used may be any one of a number of suitable codes well known to workers in the art. The way in which the present invention accomplishes a reduction in channel capacity can best be explained in relation to the particular type of coding used. If transmission over regular television channels is contemplated, then encoder 27 may comprise a remapping arrangement, such as that described in "Reducing transmission bandwidth" by R. S. Bailey and H. E. Singleton, Electronics, August 1948, wherein, for example, pairs of pulses, each pulse having $n$ possible amplitude levels are combined into a single pulse having $n^2$ possible levels. The single pulse completely defines both of the pulses in the original pair. By employing this technique on the high frequency portion of the signal, the bandwidth is halved. Accordingly, then, the total bandwidth is 0.4 megacycle plus $$\frac{3.6}{2}$$

megacycles, or 2.2 megacycles, instead of the 4 megacycles originally necessary. Heretofore, the full potentialities of remapping after quantization as a means of reducing required bandwidth have not been fully realized because of the noise effects inherent in quantization, and because of channel noise. It can be appreciated that the technique described exchanges a reduction in required bandwidth for an increased sensitivity to noise.

Figure 2:
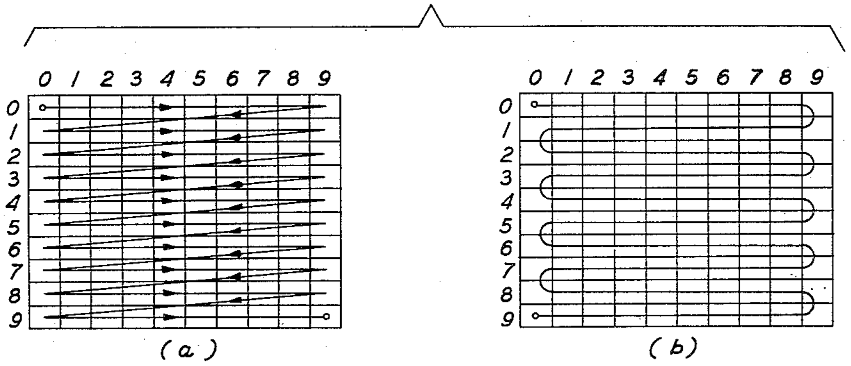

Quantization, as explained in the foregoing, is used so that the amplitude continuum of a signal may be represented by a finite alphabet of code symbols. Once this change has been made, the probability of errors in the discrete representation must be kept below a maximum allowable value, which depends upon the type of transformation from the original to the coded signal. Suppose, for example, that the sampled signal is quantized into an alphabet consisting of one hundred levels, and is then transmitted without further transformation. Suppose, in addition, that the transmission channel has a random noise whose mean square value is 40 decibels below the peak-to-peak signal value. In such a case, the probability that any one sample at the receiver will still fall within the bounds of its quantizing range is only four out of ten. In other words, approximately sixty percent of the samples are shifted into an adjacent quantizing range by the channel noise. However, as the number of quantizing levels is reduced, the error rate decreases. Thus, with only thirty levels instead of one hundred, the error rate is down to approximately ten percent, and at twenty levels it becomes approximately one-tenth of one percent. In the case of two-to-one remapping, suppose the single pulse, after remapping, has any one of one hundred discrete values, representative of pairs of pulses each having ten possible values, as illustrated in the "map" of Fig. 2*a*. If, for example, the single pulse has a value of nineteen, thereby indicating a pair of pulses of values one and nine, and the channel noise shifts the pulse to the next higher level, or a value of twenty, which indicates a pair of pulses of the values two and zero, there is an error of ten levels in one pulse and one level in the other. Such a remapping arrangement gives exceedingly poor performance. A preferred type of "map" is shown in Fig. 2*b*. As can be readily seen, since there are no discontinuities in the "map," a shift of one level in the code pulse throws one sample pulse off by one interval or level out of ten, and the other sample pulse not at all ninety percent of the time, and by one level out of ten the remaining ten percent of the time. However, as pointed out in the foregoing, since the error rate is sixty percent as a result of channel noise, there will be erroneous pulses sixty percent and six percent of the time, which is obviously intolerable. From the foregoing it is readily apparent that one of the drawbacks to a two-to-one remapping is its sensitivity to noise when a sufficient number of levels for good rendition of the signal is being transmitted.

The realization by applicant of the fact that observer tolerance to quantization is much greater in the fine detail or high frequency portions of the picture makes possible, in the present invention, the use of two-to-one remapping, hence permitting substantial reductions in required channel capacity. Inasmuch as the high frequency portions of the video signal may be quantized quite coarsely with little or no apparent loss in fidelity of reproduction, the number of necessary levels in the coded pulse is substantially reduced, hence the deleterious effects of noise are likewise reduced. Thus, if the high frequency portion of the signal is quantized at five levels, the coded pulse will have a maximum of twenty-five possible levels, and the erroneous pulses will occur approximately 5.5 percent and 1.1 percent of the time. In the case of four level quantization, the errors occur 0.2 percent and 0.05 percent of the time. If the signal-to-noise ratio is higher than 40 decibels, these error rates will be still less.

In the case where the signal-to-noise ratio is very poor, another type of coding has been used which affords transmission that is relatively insensitive to noise. This method of coding is pulse code modulation (known generally as PCM). In PCM, if there are $x$ quantizing levels, then, if $x \leqq 2^n$, each quantized pulse can be sent as a code group of $n$ bivalued (on-off) pulses, with an $n$-fold increase in required bandwidth. In the arrangement of the present invention, therefore, if the samples are quantized coarsely, such as, for example, at eight levels, instead of finely, such as sixty-four levels, then the channel capacity requirements are halved.

While the reduction in the required channel capacity has been demonstrated for two types of encoding, reduction can also be achieved with various other types of encoding, such as, for example, variable length codes, or run length codes, both of which are shown and described in "Efficient coding" by B. M. Oliver, Bell System Technical Journal, vol. III, No. 4, July 1952. In addition, the use of other types of coding with the present invention permits, in some cases, taking advantage of the statistical distribution of the signal, with a consequent further reduction in required channel capacity.

Figure 4:
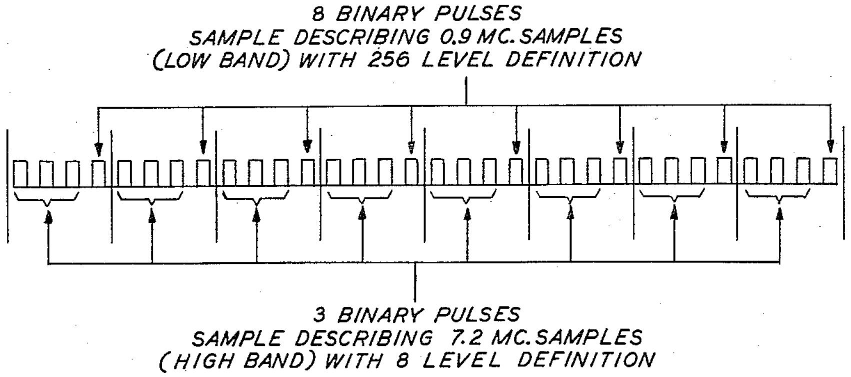
Fig. 4 is a diagram illustrating a technique for combining pulse signals for transmission.
Figure 3:
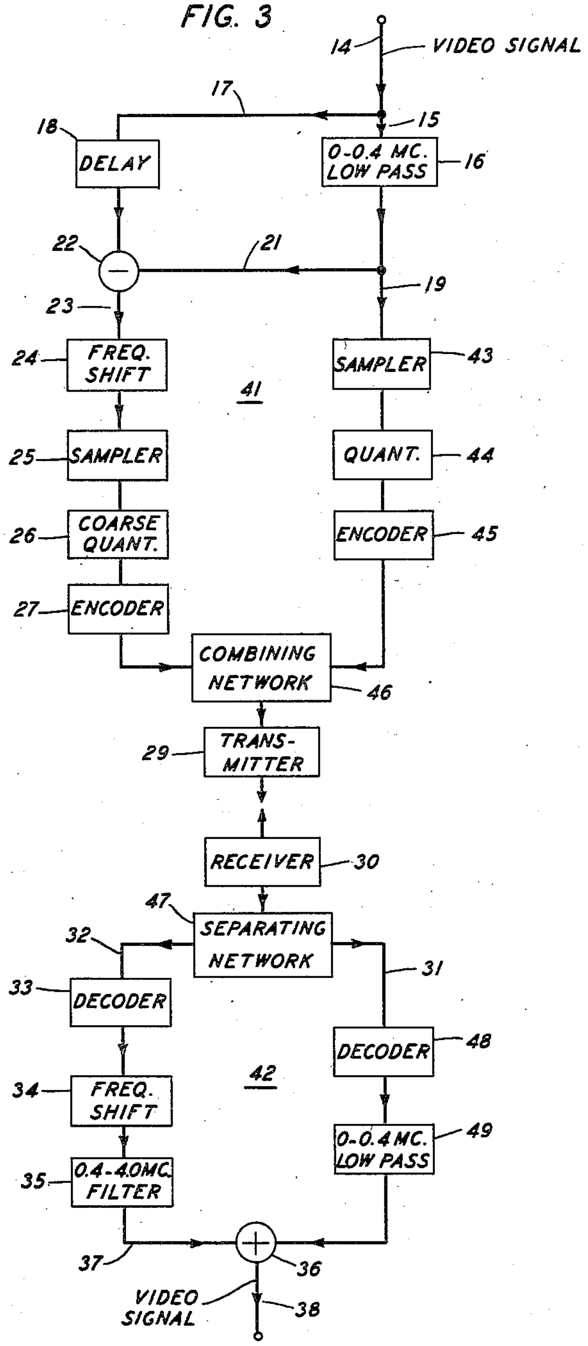
Fig. 3 is a block diagram of another television signal transmission system embodying the principles of the present invention.

In Fig. 3 there is shown a modification of the system of Fig. 1 which lends itself particularly well to PCM transmission. For the sake of clarity, those elements of the system of Fig. 3 which are the same as those in the system of Fig. 1 are numbered the same. In the system of Fig. 3, the transmitter 41 operates to separate the low and high frequency components of the signal as before. In addition, the high frequency portion of the signal, after leaving subtractor 21 is frequency shifted, sampled, and quantized in elements 24, 25, and 26 respectively, as before. The low frequency portion of the signal in path 19, is, in the present system, sampled by a sampler 43 having a sampling rate of 0.9 megacycle, for example. The signal output of sampler 43 is quantized in a quantizer 44 at 256 levels, and is then encoded in encoder 45 in a binary code of, for example, 8 pulses per sample. Thus the overall binary pulse rate is 7.2 megacycles per second. The sampled high frequency band, which occupies the range from 0 to 3.6 megacycles per second and has a sampling pulse rate of 7.2 megacycles per second is quantized in quantizer 26 to eight levels, and encoded in encoder 27 in a binary code of 3 pulses. Each group of 3 pulses is indicative of a single sampling pulse, hence the group frequency is 7.2 megacycles per second. The pulses representative of the low frequency band, since their frequency is 7.2 megacycles per second, are added in an adder circuit 46 to the pulses representative of the high frequency band to give a four digit binary pulse signal having a pulse repetition rate of 28.8 megacycles and hence requiring a bandwidth of 14.4 megacycles per second as shown in Fig. 4. The output of adder 46 is then fed to the remainder of the transmitter elements as represented by block 29. It is readily apparent that a substantial reduction in required channel capacity over that of conventional PCM is effected in the system of Fig. 3, resulting from the coarse quantizing of the high frequency portion of the signal.

At the receiver 42, the operation is substantially the reverse of that at the transmitter. Thus element 47 splits the pulses into two groups and applies to path 31 those pulses representing the low frequency portion of the signal and to path 32 those which represent the high frequency portion of the signal. Path 31 contains a decoder 48 and a low pass filter 49 having a range from zero to 0.4 megacycle per second. The output of the filter is fed to adder 36 where it is added to the high frequency signal from filter 35 to make a complete video signal which is distributed via path 38.

Figure 5:
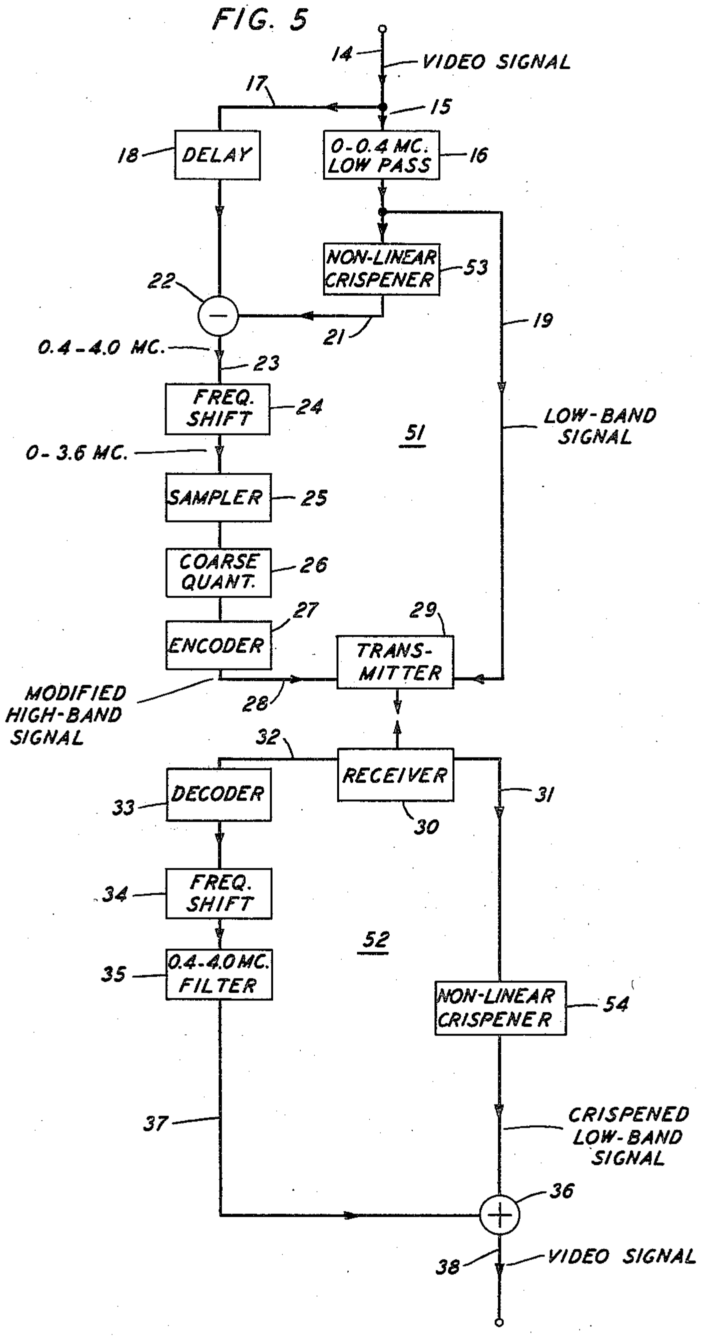
Fig. 5 is a block diagram of still another television signal transmission system embodying the principles of the present invention and which is an improvement in many respects over the systems of Figs. 1 and 3.

In Fig. 5 there is shown a preferred embodiment of the invention which in many respects is an improvement on the system of Figs. 1 and 3. In the embodiments disclosed in Figs. 1 and 3, one of the principal defects is the failure to render accurately such details as sharp edges in the television picture. Some of the high frequency energy in the video signal is accounted for by points, lines, or similar "transients" in the picture. Other high frequency components in the signal correspond to one-way brightness transitions, such as sharp edges. These are accompanied by important low frequency components as well. Thus, in the embodiments of Figs. 1 and 3, the rapid transient part of an edge will be reproduced with limited accuracy while the flat part that follows will quickly tend towards the correct brightness value. In other words, edges in the picture will be reproduced with a random overshoot or undershoot which may be as large as half the spacing between quantizing levels. Such an inaccurate reproduction of edges is the principal defect of the systems thus far described.

In the system of Fig. 5, which is similar in many respects to the system of Fig. 1, those elements which correspond to like elements in Fig. 1 have been given the same reference numerals. In transmitter 51, the video signal is applied to two parallel paths 15 and 17 which contain a low pass filter 16 and a delay line 18 respectively having the same characteristics as filter 16 and delay line 18 of the system of Fig. 1. The low frequency portion of the signal, i. e., the output of filter 16, is applied to two parallel paths 19 and 21. Path 19 leads to those elements of the transmitter which are standard, and are designated by block 29. The low frequency signal in path 21 is applied to a nonlinear crispening device 53, of the type, for example, shown in "A new technique for improving the sharpness of television pictures," by P. C. Goldmark and J. R. Hollywood, Proceedings of the Institute of Radio Engineers, October 1951. As explained in that article, a nonlinear crispener sharpens edges by adding to the low frequency wave having a slow transition (i. e., rise time) a second wave which approximates the difference between the slow transition wave and the desired rapid transition wave. The effect on the final television picture is one of increased sharpness at edges or one-way brightness transitions. The effect on the video signal is an increase in high frequency components. In the system of Fig. 5, the crispener 53 adds high frequency components to the low frequency signal in path 21. The output of the crispener is then fed to a subtractor 22, where it is subtracted from the delayed total signal. The output of subtractor 22 is a modified high frequency signal, that is, it contains fewer of the high frequency components than was the case in the systems of Figs. 1 and 3. This modified high frequency signal is then operated upon by frequency shifter 24, sampler 25, quantizer 26, and encoder 27 in the same manner as in the systems of Figs. 1 and 3, and is then fed to the remaining portions of the transmitter, block 29, from which it is transmitted along with the uncrispened low frequency signal. At receiver 52, the low frequency signal is introduced onto path 31 and the high frequency signal onto path 32 by those elements of the receiver represented by block 30. Path 32 contains a decoder 33, frequency shifter 34, and filter 35 which operate in the high frequency signal in the same manner as the corresponding elements in Figs. 1 and 3. Path 31 contains a crispener 54 which is identical in operation to crispener 53 in transmitter 51. The low frequency signal on path 31 is crispened by crispener 34 and fed to an adder 36, where it is combined with the decoded high frequency signals in path 37. The output from adder 36 is a complete video signal which is transmitted over path 38 to whatever distributing system is used. The addition of the crispening operation materially improves the operation of the system. Since the high-band signal is relieved of a large part of the burden of conveying "edge" information, the overshoot and undershoot discussed in the foregoing is less pronounced, hence the sensitivity of the system to amplitude errors is greatly reduced.

The system of Fig. 5 is similar in many respects to the system of Fig. 1. It is readily apparent that the system of Fig. 3 can likewise be greatly improved by the addition of a crispening operation on the low band signal at the transmitter and receiver, and it is to be understood that such a modification of the system of Fig. 3 is within the scope of the present invention.

Analysis of the amplitude distribution of a video signal reveals that the total signal tends to have a flat distribution of amplitudes. That is, the signal has all amplitudes between black and white with substantially equal probabilities. On the other hand, the high-band signal which is utilized in the foregoing embodiments has an amplitude distribution which is sharply peaked at zero amplitude, that is, zero amplitude occurs a large part of the time. Because of the nonuniformity of the amplitude distribution of the high band signal in the systems of Figs. 1, 3, and 5, the optimum spacing of the quantizing levels is nonuniform.

Figure 6:
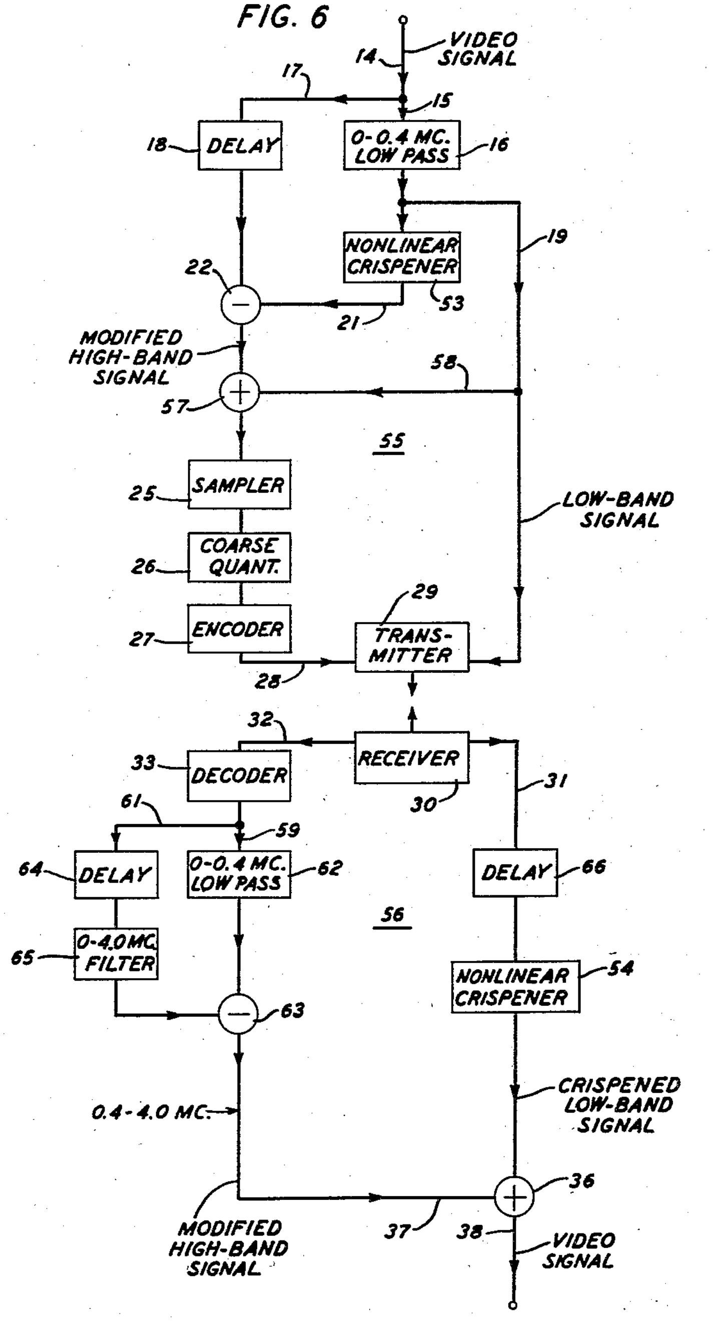
Fig. 6 is a block diagram of a signal transmission system embodying the principles of the present invention and which is particularly adapted for signal quantizing.

In Fig. 6 there is shown an embodiment of the invention which takes advantage of the uniform amplitude distribution of the total video signal to facilitate quantizing and in certain respects permits better signal rendition. Those components of the system of Fig. 6 which function in the same manner as like components in Fig. 5 are, for the sake of simplicity, designated by the same reference numerals. In transmitter 55, the video signal in path 14 is split, as before into two parallel paths 15 and 17. The signal in path 17 is delayed by delay 18 and fed to subtractor 22. The signal in path 15 is filtered by low pass filter 16, the output of which is fed to paths 19 and 21. Path 21 contains a nonlinear crispener 53 which crispens the low band signal which is then fed to subtractor 22. The output of subtractor 22, which is a modified high band signal, is fed to an adder 57 where it is added to the uncrispened low band signal in path 58. The output of adder 57 is a video signal containing all frequency components except those pertaining to "edge" information. This modified video signal is then operated upon by sampler 25, quantizer 26, and encoder 27 and is then applied via path 28 to the remainder of the components 29 of transmitter 55, from which it is transmitted along with the unmodified low band signal.

At receiver 56 the low band signal is applied to path 31 and the modified total signal to path 32 by receiver components 30. The modified signal is decoded in decoder 33 and applied to paths 59 and 61. Path 59 contains a 0–0.4 magacycle filter 62, the output of which is fed to a subtractor 63. Path 61 contains a delay 64, and a 0.4–4 megacycle filter 65, the output of which is fed to subtractor 63. The output of subtractor 63, which is a modified high-band signal, is fed to adder 36 through path 37. The unmodified low-band signal in path 31 is delayed in delay 66, which has a sufficient delay time to maintain the signal in path 31 in phase with that in path 32. The output of delay 66 is crispened in crispener 54 and applied to adder 36, where the crispened low band signal is added to the modified high band signal and distributed via path 38.

Figure 7A:
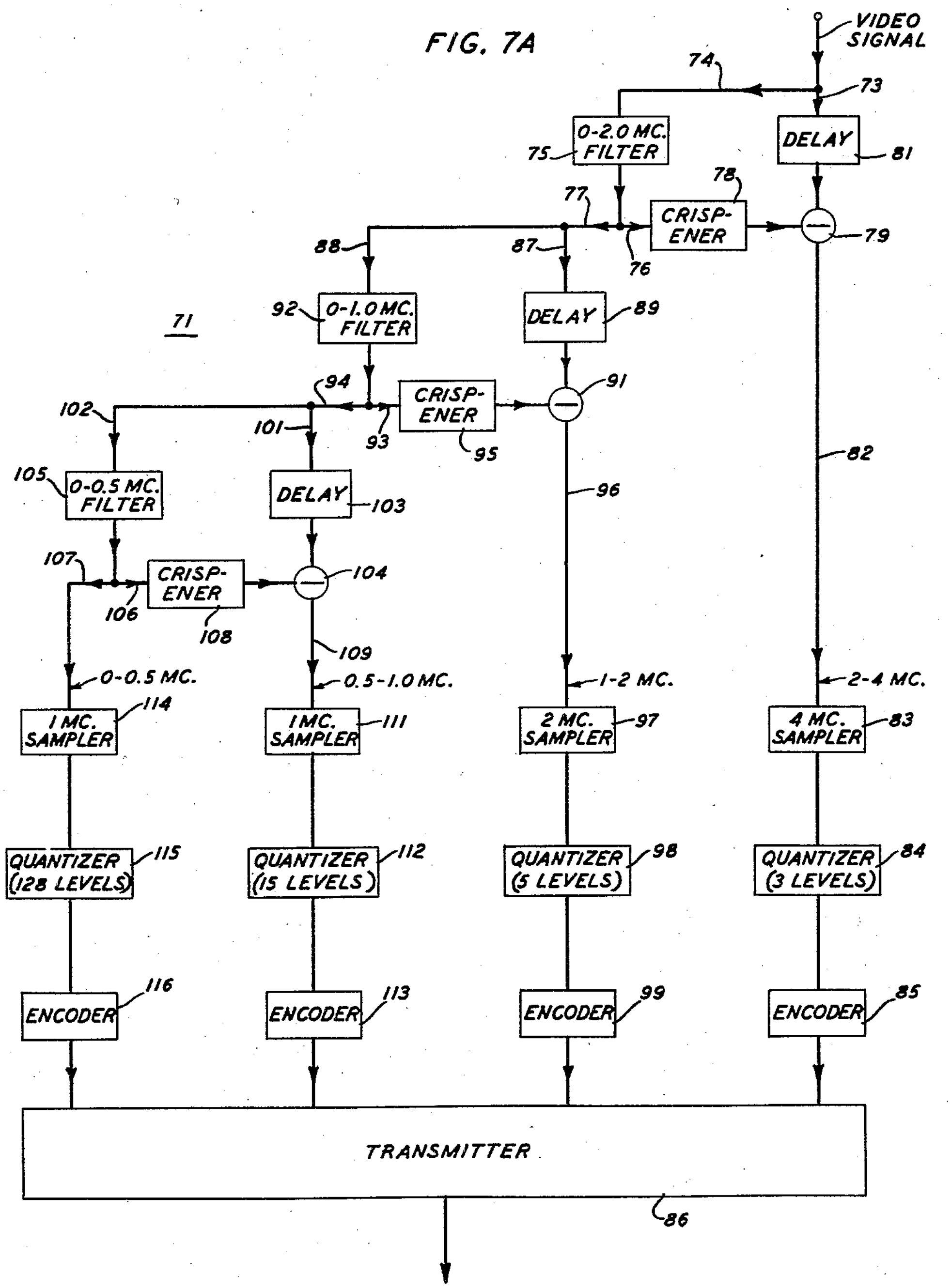
Figs. 7(*a*) and 7(*b*) are block diagrams of a refined signal transmission system embodying the principles of the present invention which exploits to a high degree the variations in visual acuity of the observer.
Figure 7B:
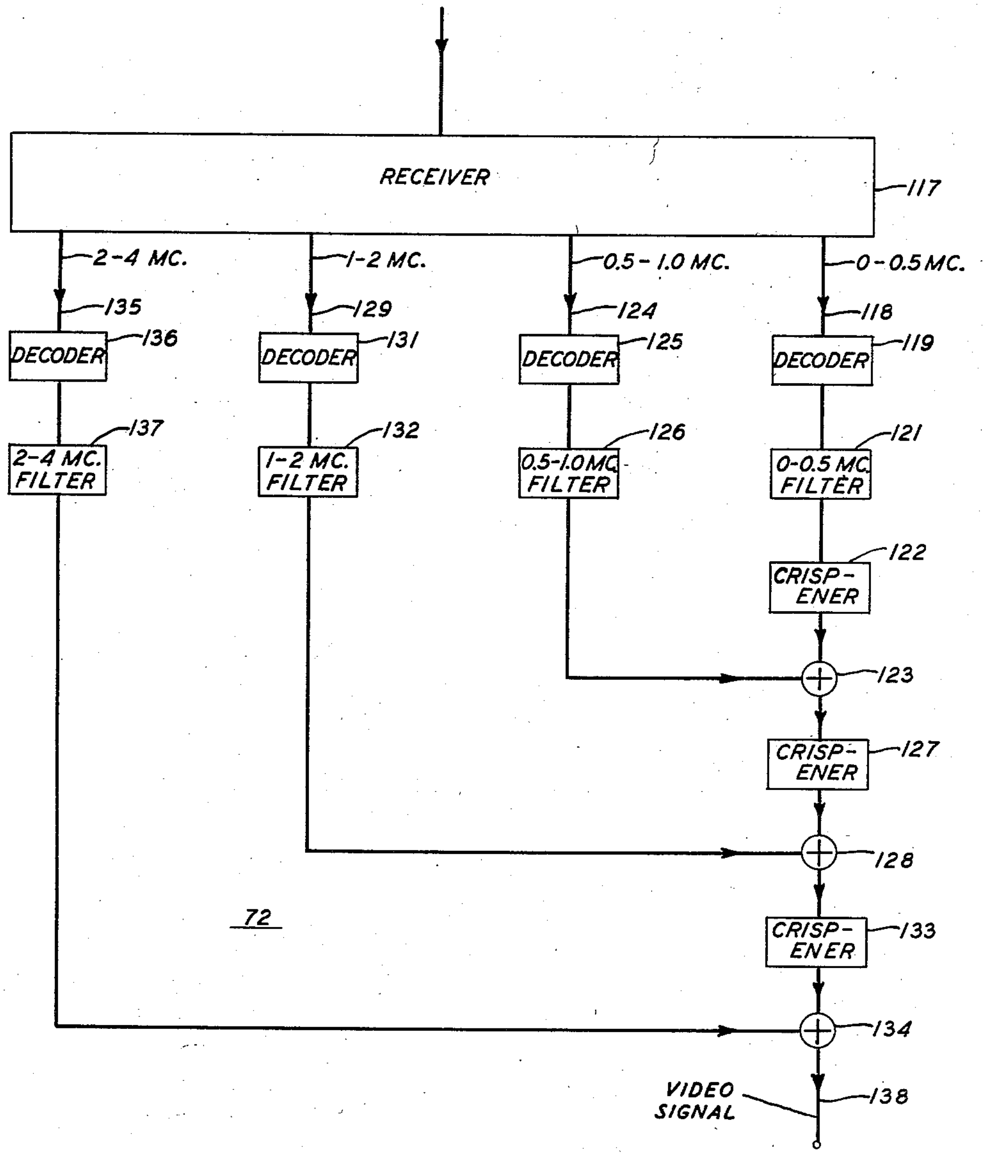

In all of the foregoing embodiments, except that shown in Fig. 6, the signal was transmitted while separated into a high frequency component and a low frequency component, the division point being near the low end of the signal spectrum. In order to achieve maximum reduction in required channel capacity, it was shown to be necessary to heterodyne the high frequency signal down to a frequency band having zero as its lower limit. It is then necessary to heterodyne the signal back up to its proper range at the receiver. In Figs. 7A and 7B there is shown a system which eliminates the necessity for heterodyning while achieving maximum efficiency of transmission, and which reduces picture degradation resulting from coarsely quantizing the high frequency signal. In Fig. 7A there is shown a transmitter 71 which, in conjunction with receiver 72 of Fig. 7B constitutes a signal transmitting system. The complete video signal from, for example, the camera tube and associated amplifiers is introduced into transmitter 71 on two parallel paths 73 and 74. Path 74 contains a zero to 2 megacycle filter 75 which passes the lower half of the 4 megacycle video signal and rejects the frequencies in the band from 2 to 4 megacycles. The output of filter 75 is applied to paths 76 and 77. Path 76 contains a nonlinear crispener 78 which, as explained in the foregoing, adds sharpness to edges in the low frequency signal. The crispened low band output of crispener 78 is applied to a subtractor 79 wherein it is subtracted from the complete video signal in path 73 which has been delayed an appropriate time by delay means 81. The output of subtractor 79 is applied through path 82 to a sampler 83. Since the subtractor output comprises a modified high frequency signal occupying a 2 to 4 megacycle band (one octave), sampler 83 samples at a 4 megacycle rate without loss of signal information. The output of the sampler is fed to a coarse quantizer 84 which quantizes the samples at, for example, three levels. The quantized samples are then encoded in encoder 85, which may take any one of the forms disclosed in the foregoing. The output of encoder 85 is then fed to the remaining, standard portions 86 of the transmitter. The low band signal in path 77 is applied to two parallel paths 87 and 88. Path 87 contains a delay element 89 which delays the zero to 2 megacycle signal an appropriate time before applying it to a subtractor 91. Path 88 contains a zero to 1 megacycle filter 92 which passes the lower half of the zero to 2 megacycle signal. This low frequency signal is applied from filter 92 to a pair of paths 93 and 94. Path 93 contains a nonlinear crispener 95 which crispens the signal and applies it to subtractor 91, where it is subtracted from the zero to 2 megacycle signal. The resulting modified signal which occupies the frequency range from one to two megacycles is applied over path 96 to a sampler 97. Since the signal applied to sampler 97 has a bandwidth of only one megacycle, occupying one octave, sampler 97 samples at a two megacycle rate without loss of signal information. The output of sampler 97 is applied to a quantizer 98 wherein the samples are quantized at, for example, five levels. The quantized samples are then encoded in encoder 99 and fed to transmitter element 86. The zero to 1 megacycle signal on path 94 is fed to two paths 101 and 102. Path 101 contains an appropriate delay element 103, the output of which goes to a subtractor 104. Path 102 contains a zero to 0.5 megacycle filter 105 which passes only the band of frequencies from zero to 0.5 megacycle. Tht output of filter 105 is fed to two paths 106 and 107. Path 106 contains a crispener 108 which crispens the zero to 0.5 megacycle signal and applies it to subtractor 104. The output of subtractor 104 is a modified signal occupying the range from 0.5 to 1 megacycle. This signal is applied over path 109 to a sampler 111 which, because the signal has a bandwidth of one-half megacycle, occupying one octave, samples at the rate of 1 megacycle without loss of information. The samples are then quantized in quantizer 112 at, for example, 15 levels, and applied to encoder 113, the output of which is applied to element 86. The zero to 0.5 megacycle signal in path 107 is applied to a sampler 114 which samples at the rate of 1 megacycle. The samples are quantized in quantizer 115 at, for example, 128 levels, and then encoded in encoder 116. The output of encoder 116 is then applied to element 86.

While in the system thus far described the type of encoding used may be any one of a number of well known types, the present system lends itself particularly well to PCM encoding. The 2 magacycle wide (2–4 megacycle) signal which is coarsely quantized at three levels in quantizer 84 represents, in binary code, 1.6 bits per sample ($2^{1.6}=3$). Since there are $4\times10^6$ samples per second, the required channel capacity is 6.4 bits per microsecond. The 1 megacycle wide (1–2 megacycle) signal which is quantized in quantizer 98 at five levels represents 2.3 bits per sample ($2^{2.3}=5$), requiring a channel capacity of 4.6 bits per microsecond. The ½ megacycle wide (0.5–1 megacycle) signal which is quantized at fifteen levels in quantizer 112 represents 3.9 bits per sample ($2^{3.9}=15$), requiring a channel capacity of 3.9 bits per microsecond. The remaining portion of the signal quantized at 128 levels in quantizer 115 represents 7 bits ($2^7=128$), and requires a channel capacity of 7 bits per microsecond. The total channel capacity required is, therefore, 21.9 bits per microsecond. Conventional systems of PCM 4 megacycle television signal transmission call for an 8 megacycle sampling rate and 128 level quantization, hence there are 7 bits per ⅛ microsecond sampling period, or 56 bits per microsecond. Thus the system of Fig. 7 utilizing the quantizing levels given, produces approximately a 60% reduction in required channel capacity with little or no apparent picture degradation. The encoding and multiplexing procedure is simplest if the number of quantizing levels in each frequency band are chosen to be integral powers of two, e. g. 4, 8, 16, and 128, instead of 3, 5, 15, and 128 levels. This results in somewhat better picture quality while requiring slightly more channel capacity. In such case there will be a required channel capacity of 25 bits or pulses per microsecond as opposed to 56 pulses with conventional PCM. Because there are four different binary codes involved, element 86 of transmitter 71 may contain any one of a number of different types of encoding and multiplexing circuits well known in the art for combining the pulses for transmission.

In addition to the foregoing type of PCM encoding, remapping such as was described in conjunction with Fig. 1 may be used. This technique is especially good if there is available a two megacycle channel having a good signal to noise ratio. In such case, the 0 to 0.5 megacycle portion of the signal need not be quantized, and it requires only one pulse per microsecond channel capacity. The same is true for the 0.5 to 1 megacycle portion of the signal which likewise does not need to be quantized. The 1 to 2 megacycle band requires two pulses per microsecond, but because only five quantizing levels are involved in each pulse, they may be combined into one pulse of twenty-five levels. The 2 to 4 megacycle band requires 4 pulses per microsecond, each pulse having three possible levels. These pulses can be combined into two pulses of nine levels each, giving a total required pulse rate, for the whole signal, of 5 pulses per microsecond, requiring a 2.5 megacycle channel. Alternatively, the 2 to 4 megacycle band pulses can be combined into one pulse of eighty-one levels. Eighty-one levels is excessive for a single pulse, however, if the 0 to 0.5 megacycle and 0.5 to 1 megacycle bands, each of one pulse, are each given two half size ranges used to convey part of the 2–4 megacycle information, the number of necessary levels for the top band pulses is reduced to approvimately twenty. The total signal is then represented by four pulses per microsecond, and a two megacycle channel is required. If such a remapping technique is used, it is to be understood that element 86 includes the necessary circuitry for combining these pulses into a pulse train for transmission, or for operating upon thepulses to prepare them for transmission. Such means are well known in the art, hence are not shown as separate elements. It will be obvious from the foregoing that other types of encoding may be used which, in many cases, result in substantial improvements over conventional systems by virtue of applicant's invention.

At the receiver station 72, the incoming signal is received in element 117. Element 117 represents those portions of a receiving station which are standard, and, in addition, the necessary circuits for separating the incoming signal into the various bands in a manner opposite to that by which they were combined for transmission in element 86 of transmitter 71. The coded zero to 0.5 megacycle is applied to path 118, where it is decoded in decoder 119, filtered in zero to 0.5 megacycle filter 121, and crispened in crispener 122. Crispener 122 operates on the signal in the identical manner that crispener 108 in transmitter 71 operated on the signal. The output of crispener 122 is fed to an adding circuit 123. The coded 0.5–1 megacycle signal is applied to path 124, decoded in decoder 125, filtered in 0.5–1 megacycle filter 126 and fed to adder 123 where it is combined with the signal in path 118. The output of adder 123 is crispened in crispener 127, which is identical to crispener 95 of transmitter 71. The output of crispener 127 is fed to adder 128. In like manner, the 1 to 2 megacycle signal is applied to path 129 where it is decoded in decoder 131, filtered in 1 to 2 megacycle filter 132, and applied to adder 128 where it is combined with the output of crispener 127. The output of adder 128 is crispened in crispener 133 and applied to adder 134. Crispener 133 is identical to crispener 78 in transmitter 71. The 2 to 4 megacycle signal is applied to path 135 where it is decoded in decoder 136, filtered in 2 to 4 megacycle filter 137 and applied to adder 134 where it is combined with the output of crispener 133. The output of adder 134 is a 4 megacycle wide video signal which is fed via path 138 to whatever means of distribution is used.

The system of Fig. 7 not only achieves substantial reductions in required channel capacity, it also achieves substantial reductions in apparent picture degradation by virtue of the finer division of the frequency band. At the same time, efficiency and simplicity are obtained by the technique of splitting the frequency band so as to make each of the upper frequency bands occupy one octave each.

It is to be understood that the various embodiments described in the foregoing are illustrative of the application of the principles of the invention. Numerous other arrangements may be devised by those skilled in the art without departing from the spirit and scope of the invention as set forth in the appended claims.

What is claimed is:

1. A system for the transmission of communication signals occupying a band of frequencies requiring a large transmission channel capacity, said system comprising at the transmitting terminal means for extracting from the original signal to be transmitted a first signal occupying a band of frequencies, means supplied with said first signal for crispening said first signal, means supplied with the original signal and the output of the crispening means for providing a modified signal, means for sampling and quantizing said modified signal, means for encoding said quantized samples, and means supplied with said first signal and said encoded quantized samples for transmitting said encoded quantized samples and said first signal to a receiving terminal.

2. A system for the transmission of communication signals occupying a band of frequencies requiring a large transmission channel capacity, said system comprising at the transmitting terminal means for reducing the required channel capacity of a signal to be transmitted, said means comprising means for extracting from the original signal to be transmitted a first signal occupying a band of frequencies, means supplied with said first signal for crispening said first signal, substracting means supplied with the original signal and the output of the crispening means for providing a modified signal, means for sampling and quantizing said modified signal, means for encoding said quantized samples, means supplied with said encoded quantized samples and said first signal for transmitting said samples and said first signal to a receiving terminal, means at the receiving terminal for reconstituting the total communication signal comprising means for decoding said coded quantized samples, means supplied with said first signal for crispening said first signal, adding means supplied with the decoded quantized samples and the output of the crispening means for providing a reconstituted communication signal.

3. A system for the transmission of comunication signals occupying a band of frequencies requiring a large transmission channel capacity, said system comprising at the transmiting terminal means for extracting from the original signal to be transmitted a first signal occupying a band of frequencies, means supplied with said first signal for crispening said first signal, means supplied with the original signal and the output of the crispening means for providing a modified signal, said modified signal occupying a band of frequencies, means for shifting the frequency band of said modified signal, means for sampling and quantizing said modified signal, means for encoding said quantized samples, and means supplied with said encoded quantized samples and said first signal for transmitting said encoded quantized samples and said first signal to a receiving terminal.

4. A system for the transmission of communication signals occupying a band of frequencies requiring a large transmission channel capacity, said system comprising at the transmitting terminal means for reducing the required channel capacity of a signal to be transmitted, said means comprising means for extracting from the original signal to be transmitted a first signal occupying a band of frequencies, means supplied with said first signal for crispening said first signal, means supplied with the original signal and the output of the crispening means for providing a modified signal, means for sampling and quantizing said modified signal, means for encoding said quantized samples, means supplied with said encoded quantized samples and said first signal for transmitting said samples and said first signal to a receiving terminal, means at the receiving terminal for reconstituting the total communication signal comprising means for decoding said coded quantized samples, means for shifting the frequency band of the decoded quantized samples in a direction opposite to and an amount equal to that by which the modified signal was shifted at the transmitter, means supplied with said first signal for crispening said first signal, means supplied with the decoded quantized samples and the output of the crispening means for providing a reconstituted communication signal.

5. In a system for the transmission of communication signals occupying a band of frequencies requiring a large transmission channel capacity, means for reducing the channel capacity requirements of said system comprising means at the transmitter for dividing the signal to be transmitted into a plurality of signals each occupying a different frequency band, means for subtracting a portion of the high frequency components from at least one of said signals to obtain a modified signal, means for sampling said modified signal, means for quantizing the samples, and means for encoding successive quantized samples to produce a plurality of pulses indicative of said modified signal, said pulses having a reduced channel capacity requirement.

6. In a system for the transmission of communication signals occupying a band of frequencies requiring a large transmission channel capacity, means for reducing the channel capacity requirements of said system comprising means at the transmitter for dividing the signal to be transmitted into a plurality of signals each occupying a different frequency band, means for subtracting a portion of the high frequency components from at least one of said signals to obtain a modified signal, means for sampling said modified signal, means for quantizing the samples, means for encoding successive quantized samples to produce a plurality of pulses indicative of said signal, said pulses having a reduced channel capacity requirement means at the receiver for decoding said pulses to produce a signal corresponding to said modified signal and means for combining said signal with the other signals and with high frequency components corresponding to the high frequency components subtracted from said one signal at the transmitter to produce a complete communication signal.

7. In a system for the transmission of communication signals occupying a band of frequencies requiring a large transmission channel capacity, means for reducing the channel capacity requirements of said system comprising means at the transmitter for dividing the signal to be transmitted into a plurality of signals each occupying a different frequency band, means for shifting the frequency band of at least one of said signals, means for sampling said shifted signal at a predetermined sampling rate, means for quantizing the samples, means for encoding succesive quantized samples to provide a plurality of pulses corresponding to said shifted signal, said pulses having a repetition frequency rate less than said sampling rate.

8. In a system for the transmission of communication signals occupying a band of frequencies requiring a large transmission channel capacity, means for reducing the channel capacity requirements of said system comprising means at the transmitter for dividing the signal to be transmitted into a plurality of signals each occupying a different frequency band, means for shifting the frequency band of at least one of said signals, means for sampling said shifted signal at a predetermined sampling rate, means for quantizing the samples, means for encoding successive quantized samples to provide a plurality of pulses coresponding to said shifted signal, said pulses having a repetition frequency rate less than said sampling rate, means at the receiver for decoding said pulses, and means for shifting said decoded pulses to a frequency band corresponding to the original frequency band of said signal.

9. In a system for the transmission of communication signals occupying a band of frequencies requiring a large transmission channel capacity, means for reducing the channel capacity requirements of said system comprising means at the transmitter for dividing the signal to be transmitted into a plurality of signals each occupying a different frequency band, means for subtracting a portion of the high frequency components from at least one of said signals, means for shifting the frequency band of said one signal, means for sampling said shifted signal, means for quantizing the samples, means for encoding successive quantized samples to produce a plurality of pulses indicative of said signal, said pulses having a reduced channel capacity requirement.

10. In a system for the transmission of communication signals occupying a band of frequencies requiring a large transmission channel capacity, means for reducing the channel capacity requirements of said system comprising means at the transmitter for dividing the signal to be transmitted into a plurality of signals each occupying a different frequency band, means for subtracting a portion of the high frequency components from at least one of said signals, means for shifting the frequency band of said one signal, means for sampling said shifted signal, means for quantizing the samples, means for encoding successive quantized samples to produce a plurality of pulses indicative of said signal, means at the receiver for decoding said pulses to produce a signal corresponding to said shifted signal, means for shifting said signal to the frequency band occupied by said one signal and means for combining said signal with the other signals and with high frequency components corresponding to the high frequency components subtracted from said one signal at the transmitter to produce a complete communication signal.

11. A system for the transmission of communication signals occupying a band of frequencies requiring a large transmission channel capacity, said system comprising a transmitter and a receiver, means at the transmitter for dividing the signal to be transmitted into a plurality of signals each occupying a different frequency band, means for reducing the channel capacity requirements of at least one of said signals comprising means for shifting the frequency band of said signal, means for sampling said signal, means for quantizing successive samples, and means for encoding successive quantized samples to produce a plurality of pulses indicative of said signal; means for transmitting said pulses and the remainder of said signals to the receiver, means at the receiver for decoding said pulses, means for shifting the frequency band of said pulses, and means for combining the pulses with the remaining signals to produce a complete communication signal.

12. A system for the transmission of communication signals occupying a band of frequencies requiring a large transmission channel capacity, said system comprising at the transmitting terminal means for extracting from the original signal to be transmitted a first signal occupying a band of frequencies, means supplied with said first signal for crispening said first signal, means supplied with the original signal and the output of the crispening means for providing a modified signal, adding means supplied with said modified signal and said uncrispened first signal for providing a second modified signal, means for sampling and quantizing said second modified signal, means for encoding said quantized samples, and means supplied with said first signal and said encoded quantized samples for transmitting said uncoded quantized samples and said first signal to a receiving terminal.

13. A system for the transmission of communication signals occupying a band of frequencies requiring a large transmission channel capacity, said system comprising at the transmitting terminal means for extracting from the original signal to be transmitted a first signal occupying a band of frequencies, means supplied with said first signal for crispening said first signal, means supplied with the original signal and the output of the crispening means for providing a modified signal, adding means supplied with said modified signal and said uncrispened first signal for providing a second modified signal, means for sampling and quantizing said second modified signal, means for encoding said quantized samples, and means supplied with said first signal and said encoded quantized samples for transmitting said encoded quantized samples and said first signal to a receiving terminal, means at the receiving terminal for reconstituting the total signal comprising means for decoding said coded quantized samples, means supplied with said first signal for crispening said first signal, means for extracting from said samples a signal occupying the same band of frequencies or said first signal, subtracting means supplied with said signal and with said decoded quantized pulses for providing a modified signal, and adding means supplied with the modified signal and the output of the crispening means for providing a reconstituted communication signal.

14. A system for the transmission of communication signals occupying a band of frequencies requiring a large transmission channel capacity, said system comprising at the transmitting terminal means for extracting from the original signal to be transmitted a first signal occupying a band of frequencies, means supplied with said first signal for crispening said first signal, means supplied with the original signal and the output of the crispening means for providing a first modified signal, means for sampling said first modified signal at a first sampling rate, means for quantizing the samples at a first number of quantizing levels, means for encoding the quantized samples, means for extracting from said first signal a second signal occupying a band of frequencies, means supplied with said second signal for crispening said second signal, means supplied with said first signal and the output of said crispening means for providing a second modified signal, means for sampling said second modified signal at a second sampling rate different from said first sampling rate, means for quantizing the samples at a second number of quantizing levels different from said first number of quantizing levels, means for encoding the quantized samples, means for extracting from said second signal a third signal occupying a band of frequencies, means supplied with said third signal for crispening said third signal, means supplied with said second signal and the output of the crispening means for providing a third modified signal, means for sampling said third modified signal at a third sampling rate different from said first and second sampling rate, means for quantizing the samples at a third number of quantizing levels different from said first and second numbers of levels, means for encoding the samples, means for sampling said third signal at a predetermined rate, means for quantizing the samples at a fourth number of quantizing levels different from the first, second and third numbers of levels, means for encoding the quantized samples, and means supplied with all of the encoded quantized samples for transmitting said samples to a receiving terminal.

15. A system for the transmission of communication signals as claimed in claim 14 wherein the means for extracting said first signal comprises a first band pass filter, the means for extracting said second signal comprises a second filter having a pass band approximately one-half as wide as the pass band of said first signal, and the means for extracting said third signal comprises a third filter having a pass band approximately one-half as wide as the pass band of said second filter.

16. A system for the transmission of communication signals occupying a band of frequencies requiring a large transmission channel capacity, said system comprising at the transmitting terminal means for extracting from the original signal to be transmitted a first signal occupying a band of frequencies, means supplied with said first signal for crispening said first signal, means supplied with the original signal and the output of the crispening means for providing a first modified signal, means for sampling said first modified signal at a first sampling rate, means for quantizing the samples at a first number of quantizing levels, means for encoding the quantized samples, means for extracting from said first signal a second signal occupying a band of frequencies, means supplied with said second signal for crispening said second signal, means supplied with said first signal and the output of said crispening means for providing a second modified signal, means for sampling said second modified signal at a second sampling rate different from said first sampling rate, means for quantizing the samples at a second number of quantizing levels different from said first number of quantizing levels, means for encoding the quantized samples, means for extracting from said second signal a third signal occupying a band of frequencies, means supplied with said third signal for crispening said third signal, means supplied with said second signal and the output of the crispening means for providing a third modified signal, means for sampling said third modified signal at a third sampling rate different from said first and second sampling rates, means for quantizing the samples at a third number of quantizing levels different from said first and second numbers of levels, means for encoding the samples, means for sampling said third signal at a predetermined rate, means for quantizing the samples at a fourth number of quantizing levels different from the first, second and third numbers of levels, means for encoding the quantized samples, and means supplied with all of the encoded quantized samples for transmitting said samples to a receiving terminal, means at said receiving terminal for decoding the encoded quantized samples indicative of said third signal, means supplied by said decoded samples for crispening said third signal, means for decoding the encoded quantized samples indicative of said third modified signal, adding means supplied by the crispened samples of said third signal and the samples of said third modified signal for providing a first combined signal, means supplied with said first combined signal for crispening said signal, means for decoding the encoded quantized samples indicative of said second modified signal, adding means supplied by the crispened first combined signal and the decoded samples of said second modified signal for providing a second combined signal, means supplied with said second combined signal for crispening said signal, means for decoding the encoded quantized samples indicative of said first modified signal, adding means supplied with said crispened second combined signal and the decoded pulses of said first modified signal for providing a third combined signal, said third combined signal being the reconstituted communication signal.

17. A system for the transmission of communication signals as claimed in claim 16 wherein the means for extracting said first signal comprises a first band pass filter, the means for extracting said second signal comprises a second filter having a pass band approximately one-half as wide as the pass band of said first signal, and the means for extracting said third signal comprises a third filter having a pass band approximately one-half as wide as the pass band of said second filter.

18. A system for the transmission of communication signals as claimed in claim 17 wherein said first filter has a pass band of approximately two megacycles per second, said second filter has a pass band of approximately one megacycle per second, and said third filter has a pass band of approximately one-half megacycle per second.

19. A system for the transmission of communication signals as claimed in claim 18 wherein the means for sampling said first modified signal has a sampling rate of four megacycles per second, the means for sampling said second modified signal has a sampling rate of two megacycles per second, the means for sampling said third modified signal has a sampling rate of one megacycle per second and the means for sampling said third signal has a one megacycle per second sampling rate.

20. A system for the transmission of communication signals as claimed in claim 18 wherein the means for quantizing the samples of said first modified signal has three quantizing levels, the means for quantizing the samples of said second modified signal has five quantizing levels, the means for quantizing the samples of said third modified signal has fifteen quantizing levels, and the means for quantizing the samples of said third signal has one hundred and twenty-eight quantizing levels.

21. A system for the transmission of television signals, occupying a zero to four megacycle band of frequencies, said system comprising at the transmitting terminal means for extracting from the original signal to be transmitted a first signal occupying a zero to four hundred kilocycle band of frequencies, crispening means supplied with said first signal for altering the rapidity of amplitude changes in said first signal in accordance with the character fo those changes whereby high frequency information is added to said first signal, means supplied with the original signal and the output of the crispening means for providing a modified signal occupying a frequency band from four hundred kilocycles to four megacycles, means for sampling and quantizing said modified signal, means for encoding said quantized samples, and means supplied with said encoded quantized samples and said first signal for transmitting the signals to a receiving terminal.

22. A system for the transmission of television signals, occupying a zero to four megacycle band of frequencies, said system comprising at the transmitting terminal means for extracting from the original signal to be transmitted a first signal occupying a zero to four hundred kilocycle band of frequencies, crispening means supplied with said first signal for altering the rapidity of amplitude changes in said first signal in accordance with the character of those changes whereby high frequency information is added to said first signal, means supplied with the original signal and the output of the crispening means for providing a modified signal occupying a frequency band from four hundred kilocycles to four megacycles, means for sampling and quantizing said modified signal, means for encoding said quantized samples, and means supplied with said encoded quantized samples and said first signal for transmitting the signals to a receiving terminal, means at the receiving terminal for reconstituting the total television signal comprising means for decoding said coded quantized samples, crispening means supplied with said first signal for altering the rapidity of amplitude changes in said first signal in accordance with the character of those changes whereby high frequency information is added to said first signal, and adding means supplied with the output of said crispening means and the decoded quantized samples for providing a reconstituted television signal.

References Cited in the file of this patent

UNITED STATES PATENTS

| | | |
|---|---|---|
| 2,516,587 | Peterson | July 25, 1950 |
| 2,530,538 | Rack | Nov. 21, 1950 |
| 2,664,462 | Bedford et al. | Dec. 29, 1953 |